United States Patent
Yinger et al.

(10) Patent No.: US 11,328,037 B2
(45) Date of Patent: May 10, 2022

(54) MEMORY-SIZE- AND BANDWIDTH-EFFICIENT METHOD FOR FEEDING SYSTOLIC ARRAY MATRIX MULTIPLIERS

(71) Applicant: Intel Corporation, Santa Clara, CA (US)

(72) Inventors: Jack Z. Yinger, San Jose, CA (US); Andrew Ling, Toronto (CA); Tomasz Czajkowski, Toronto (CA); Davor Capalija, Toronto (CA); Eriko Nurvitadhi, San Jose, CA (US); Deborah Marr, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 1065 days.

(21) Appl. No.: 15/644,526

(22) Filed: Jul. 7, 2017

(65) Prior Publication Data
US 2019/0012295 A1 Jan. 10, 2019

(51) Int. Cl.
*G06F 17/16* (2006.01)
*G06F 7/544* (2006.01)

(52) U.S. Cl.
CPC .......... *G06F 17/16* (2013.01); *G06F 7/5443* (2013.01); *G06F 2207/3892* (2013.01)

(58) Field of Classification Search
CPC .......... G06F 17/16; G06F 2207/3892; G06F 15/8046; G06F 15/8023; G06F 7/5443
See application file for complete search history.

(56) References Cited

U.S. PATENT DOCUMENTS

| | | | | |
|---|---|---|---|---|
| 8,924,455 | B1 * | 12/2014 | Barman | G06F 7/5443 708/607 |
| 9,645,974 | B1 * | 5/2017 | Patil | G06F 17/16 |
| 10,515,046 | B2 * | 12/2019 | Fleming | G06F 13/423 |
| 10,515,303 | B2 * | 12/2019 | Lie | G06N 3/063 |
| 10,521,488 | B1 * | 12/2019 | Ross | G06F 17/16 |
| 10,572,376 | B2 * | 2/2020 | Fleming, Jr. | G06F 3/0685 |
| 10,713,214 | B1 * | 7/2020 | Shalev | G06F 7/5443 |
| 10,853,448 | B1 * | 12/2020 | Shalev | G06F 17/16 |
| 10,878,316 | B2 * | 12/2020 | Ross | G06N 3/063 |

(Continued)

OTHER PUBLICATIONS

Ling et al. in "Creating High Performance Applications with Intel's FPGA SDK for OpenCL" on IWOCL 2017. Retrieved on [Jul. 24, 2020], Retrieved from the Internet <https://www.iwocl.org/wp-content/uploads/iwocl2017-andrew-ling-fpga-sdk.pdf> (Year: 2017).*

(Continued)

*Primary Examiner* — Emily E Larocque
*Assistant Examiner* — Carlo Waje
(74) *Attorney, Agent, or Firm* — Fletcher Yoder, P.C.

(57) ABSTRACT

Matrix multiplication systolic array feed methods and related processing element (PE) microarchitectures for efficiently implementing systolic array generic matrix multiplier (SGEMM) in integrated circuits is provided. A systolic array architecture may include a processing element array, a column feeder array, and a row feeder array. A bandwidth of external memory may be reduced by a factor of reduction based on interleaving of the matrix data via a feeding pattern of the column feeder array and the row feeder array.

21 Claims, 7 Drawing Sheets

(56) References Cited

U.S. PATENT DOCUMENTS

| | | | | |
|---|---|---|---|---|
| 2016/0179434 | A1* | 6/2016 | Herrero Abellanas | ...................... G06F 3/0644 711/155 |
| 2018/0074996 | A1* | 3/2018 | Ling | ........................ H01L 22/34 |
| 2018/0157465 | A1* | 6/2018 | Bittner | .................... G06N 3/063 |
| 2018/0165577 | A1* | 6/2018 | Young | .................... G06N 3/063 |
| 2018/0267809 | A1* | 9/2018 | Li | ........................ G06F 13/1673 |
| 2018/0267936 | A1* | 9/2018 | Chen | ........................ G06F 17/16 |
| 2018/0307438 | A1* | 10/2018 | Huang | .................... G06F 5/065 |
| 2018/0314671 | A1* | 11/2018 | Zhang | .................. G06N 3/0454 |
| 2020/0110989 | A1* | 4/2020 | Xu | .......................... G06N 3/063 |
| 2020/0134417 | A1* | 4/2020 | Mohapatra | ............... G06N 3/04 |
| 2021/0019618 | A1* | 1/2021 | Ross | ........................ G06N 3/063 |

OTHER PUBLICATIONS

Nurvitadhi et al. in "Can FPGAs Beat GPUs in Accelerating Next-Generation Deep Neural Networks?" on FPGA '1, Feb. 22-24, 2017. Retrieved on [Jul. 24, 2017], Retrieved from the Internet <https://dl.acm.org/doi/pdf/10.1145/3020078.3021740> (Year: 2017).*

Venkatesh et al. in "Accelerating Deep Convolutional Networks using low-precision and sparsity," 2017 IEEE International Conference on Acoustics, Speech and Signal Processing (ICASSP), New Orleans, LA, 2017, pp. 2861-2865, doi: 10.1109/ICASSP.2017. 7952679. (Year: 2017).*

Yinger et al. in "Customizable FPGA OpenCL matrix multiply design template for deep neural networks" 2017 International Conference on Field Programmable Technology (ICFPT), Melbourne, VIC, 2017, pp. 259-262, doi: 10.1109/FPT.2017.8280155 (Year: 2017).*

Peemen et al. in "Memory-centric accelerator design for Convolutional Neural Networks," on 2013 IEEE 31st International Conference on Computer Design (ICCD), Asheville, NC, 2013, pp. 13-19, doi: 10.1109/ICCD.2013.6657019. (Year: 2012).*

Jouppi et al. in "In-Datacenter Performance Analysis of a Tensor Processing Unit" on ISCA '17, Jun. 24-28, 2017. Retrieved on [Jul. 24, 2017], Retrieved from the Internet <https://dl.acm.org/doi/pdf/10.1145/3140659.3080246> (Year: 2017).*

IWOCL 2017 Conference Program Archive and Downloads. Retrieved on [Jul. 24, 2020]. Retrieved from the Internet <https://www.iwocl.org/iwocl-2017/conference-program/> (Year: 2017).*

Vucha et al. in "Design and FPGA Implementation of Systolic Array Architecture for Matrix Multiplication" on International Journal of Computer Applications, vol. 26 No. 3. Retrieved from the Internet <https://pdfs.semanticscholar.org/803f/79c4ffd2584dcf30649f4862ddde0a3e3398.pdf> (Year: 2011).*

Ardavan Pedam et al., A High-Performance, Low-Power Linear Algebra Core, 9 pages.

Paolo Zicari et al., A matrix product accelerator for field programmable systems on chip, Microprocessors and Microsystems 32 (2008).

Th. Leppert et al., Hyper-Systolic Matrix Multiplication, Parallel Computing (2001).

Sun-Yuan Kung, Senior Member, IEEE, On Supercomputing with Systolic/Wavefront Array Processors, Proceedings of the IEEE, vol. 72, No. 7. Jul. 1964.

* cited by examiner

MEMORY-SIZE- AND BANDWIDTH-EFFICIENT METHOD FOR FEEDING SYSTOLIC ARRAY MATRIX MULTIPLIERS

BACKGROUND

The present disclosure relates generally to matrix multiply operations. More particularly, the present disclosure relates to methods and apparatuses to implement systolic array matrix multiplier for matrix multiply operations.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous numerical computing applications, such as high-performance computing (HPC), deep learning (e.g., study of artificial neural networks and related machine learning algorithms), and digital signal processing (DSP), rely on matrix multiplication computations. Systolic array generic matrix multiplier (SGEMM) is an approach that has seen great success in hardware and software to perform matrix multiplication computations. However, current hardware SGEMM implementations may not be well suited for field-programmable gate array (FPGA) platform or computation of very large matrix sizes. For example, there may be challenges to circumvent challenges relating to limitations in external random-access memory (RAM) bandwidth and limitations in FPGA block static random-access memory (SRAM) quantity.

BRIEF DESCRIPTION OF THE DRAWINGS

Advantages of the present disclosure may become apparent upon reading the following detailed description and upon reference to the drawings in which.

DETAILED DESCRIPTION OF SPECIFIC EMBODIMENTS

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. The techniques presented and claimed herein are referenced and applied to material objects and concrete examples of a practical nature that demonstrably improve the present technical field and, as such, are not abstract, intangible or purely theoretical.

Present embodiments relate to matrix multiplication systolic array feed method and related processing element (PE) microarchitectures for efficiently implementing systolic array generic matrix multiplier (SGEMM) in field-programmable gate array (FPGA) or application-specific integrated circuit (ASIC) hardware. Data (e.g., matrices) inputted to the matrix multiplication systolic array through feed banks are subdivided in blocks (e.g., dividing matrices into blocks, block banking) and interleaved segments, such that data in the feed banks are reused in space (e.g., block banking) and in time (e.g., interleaved data feeding). Such data reuse scheme (in space and in time) enables the SGEMM to perform matrix multiplication on larger matrices by computing one block at a time, resulting in FPGA block SRAM savings and enabling a quadratic reduction in external RAM bandwidth requirement. The SGEMM may be implemented for scalar, inner vector product, and outer vector product multiplications, as well as for sparse and dense matrix multiplications.

Figure 1:
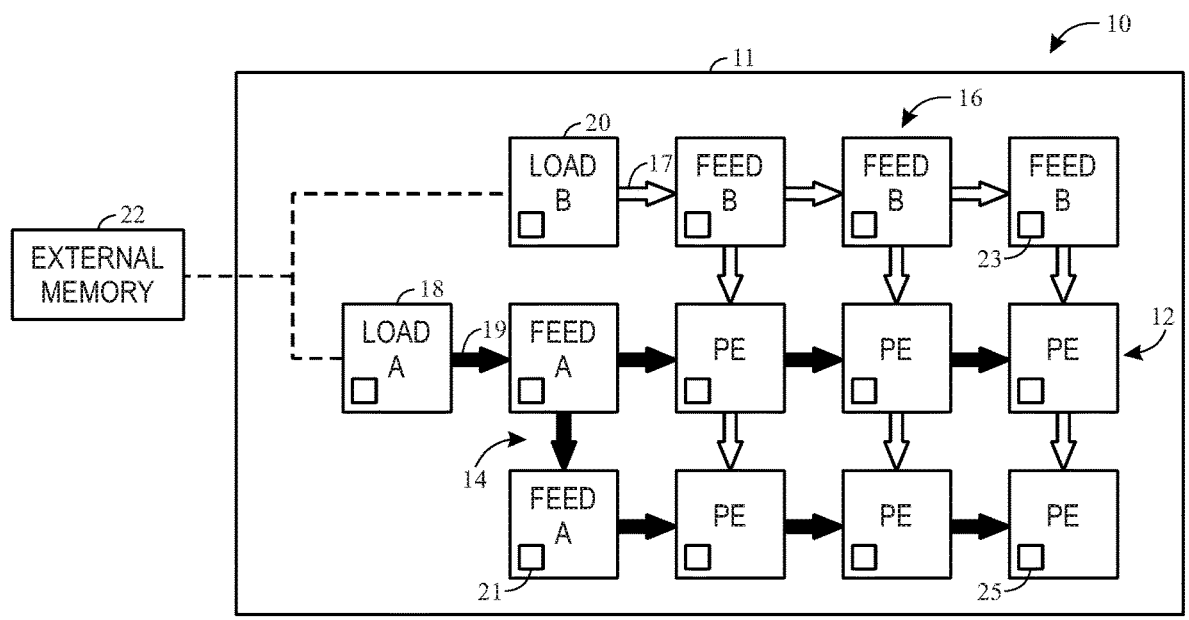
FIG. 1 is a block diagram of an example systolic array generic matrix multiplier (SGEMM) architecture for feeding input matrices into a processing element (PE) array where matrix multiplication calculation is performed to output a result matrix, in accordance with an embodiment.

FIG. 1 shows a block diagram illustrating an example architecture of a systolic array generic matrix multiplier (SGEMM) 10 implemented on an integrated circuit 11. The integrated circuit 11 may represent, for example, a programmable logic device such as a field-programmable gate array (FPGA) or an application-specific integrated circuit (ASIC) that includes circuitry that is designed and/or programmed in the manner of this disclosure. In the illustrated embodiment, the SGEMM 10 includes a two-dimensional (2D) processing elements (PE) array 12 (e.g., a 2×3 array) coupled to two feeder arrays 14 and 16 (e.g., "Feed A" and "Feed B") along orthogonal edges of the PE array 12. The feeder arrays 14 and 16 are coupled to loaders 18 and 20 (e.g., "Load A" and "Load B"), which are coupled to an external memory 22, such as an external RAM. Although the memory 22 is described as "external" to the integrated circuit 11, additionally or alternatively, it may be on-chip or "internal" to the integrated circuit 11. In operation, the matrix data are loaded from the external memory 22 to the loaders 18 and 20, to the feeders 14 and 16 that buffer the input matrix data. For example, each of the feeders 14 and 16 has a buffer memory 21 and 23, respectively, which serves as a "bank" to temporarily store the matrix data. The feeders 14 and 16 then pass vectors of the input matrix data into the PE array 12 where the matrix multiplication occurs. Similarly, each of the PE in the PE array 12 has a buffer memory 25 to serve as a "bank" to temporality store the calculated result. Within the PE array 12 the data transfer is propagated in a linear fashion to the subsequent PEs as illustrated by the arrows 17 and 19 between the PEs, passing through the PE array 12 along rows or columns. Each of the PEs is responsible for processing its input and passing that data to the next PEs in its row and column, and the result may be drained along one of the PE array 12 axes (e.g., the edge or axes along the feeders 14 or along the feeders 16).

Figure 2:
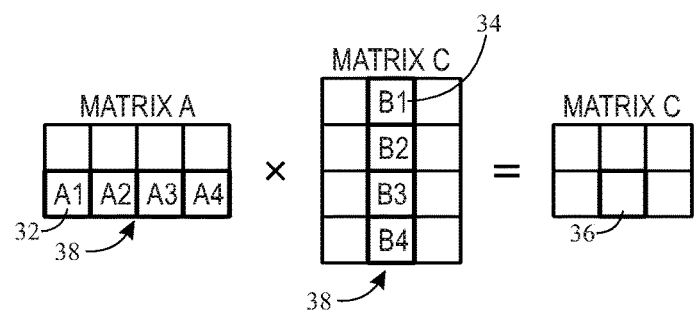
FIG. 2 is an example matrix multiplication illustrating matrix blocking of input and output matrices according to the SGEMM architecture of FIG. 1, in accordance with an embodiment.

To compute multiplications of large matrices, both input and output matrices are divided into a hierarchy of components including blocks, banks, segments, and vectors. The nesting and dimensions of these divisions is tied to the PEs of the SGEMM 10. The detail of such hierarchy, including "blocks," "banks," "segments," and "units or vectors" is discussed below with reference to multiplication of "matrix A" and "matrix B." FIG. 2 shows an example of "matrix blocking," wherein the input matrix A (e.g., a 2×4 matrix) is divided into matrix blocks 32 and the input matrix B (e.g., a 4×3 matrix) is divided into matrix blocks 34. The input matrix A and matrix B may be stored in the external memory 22, and upon execution of the matrix multiplication, the input matrices A and B are fed into the PE array 12 to compute a resulted matrix C (e.g., a 2×3 matrix). Specifically, a row of the input matrix A blocks 32 and a column of the input matrix B blocks 34 are fed into the PE array 12 to compute a value for a block 36 of the matrix C in the same fashion as a row and a column of two matrices being multiplied, resulting in a scalar of the result matrix through a dot product operation.

The matrix blocks 32 and 34 loaded from the external memory 22 (e.g., external RAM) are divided evenly into "banks" stored in the feeder's buffer memories 21 and 23. For example, as depicted in FIG. 2, a row of the matrix blocks 32 (e.g., A1, A2, A3, and A4) are in one bank, and a column of the matrix blocks 34 (e.g., B2, B2, B3, and B4) are in another bank. The SGEMM 10 only loads one pair 38 (e.g., A1, A2, A3, and A4 and B1, B2, B3, and B4) of the matrix blocks 32 and 34 from the external memory 22 into feeder "banks" at a time. Consequently, the PE array 12 may operate on arbitrarily large matrices with the sizes of the matrices being limited by the on-chip memory (e.g., a FPGA-RAM) as opposed to the external memory 22. For example, with reference to FIG. 1, the size of the matrix blocks 32 and the size of the matrix blocks 34 are dictated or limited by the sizes of the buffer memories 21 and 23 instead of the external memory 22. For each loaded pair 38, the PE of the PE array 12 computes the multiplication of one pair of matrix blocks 32 and 34 (e.g., A1-B1, A2-B2, A3-B3, and A4-B4 pairs in this case) at a time with each pair generating a partial result, and accumulates the partial results until all pairs have been computed. Once all pairs have been computed, a corresponding block 36 of the resulting matrix C is drained from the PE bank (e.g., buffer memory 25). The concept of "banking" described above is depicted in FIG. 3.

Figure 3:
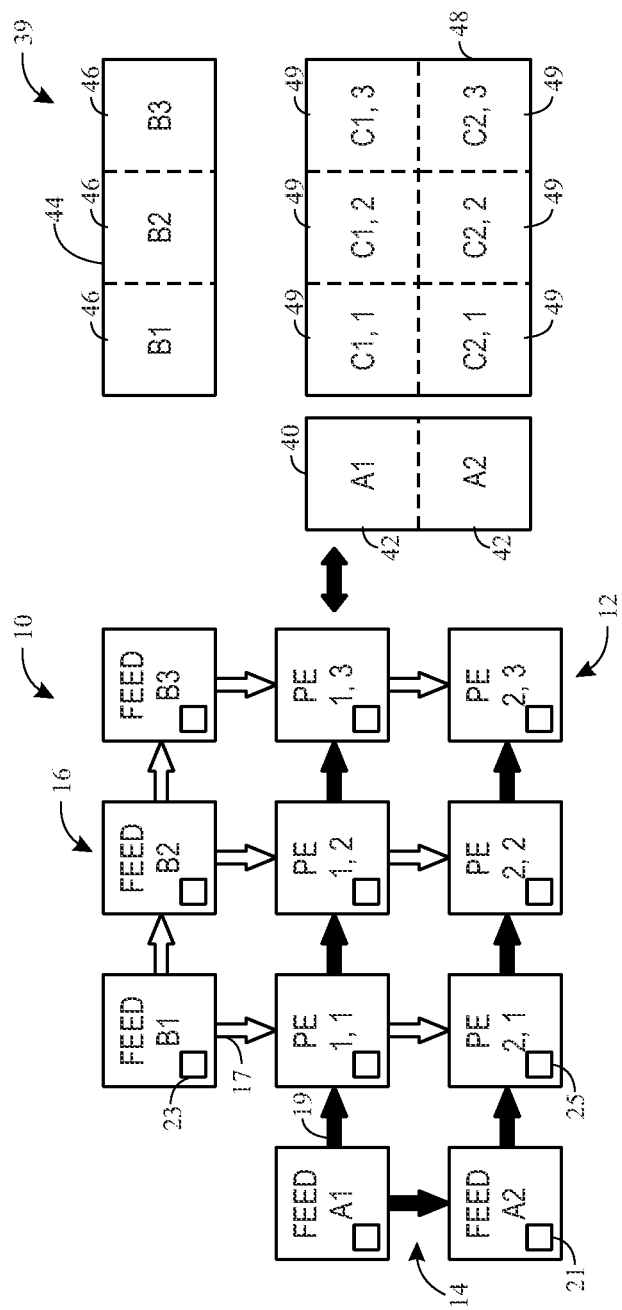
FIG. 3 is a block diagram showing an example banking of input and output matrices according to the SGEMM architecture of FIG. 1, in accordance with an embodiment.

FIG. 3 shows an example of "banking" 39 of the input and output matrices, illustrating correspondence between PEs and block banks. Herein, an "A" block 40 (corresponding to the input matrix A) is subdivided to be fed into the PE array 12 through two feeder banks or banks 42 (e.g., $A_1$ and $A_2$ buffered by the buffer memories 21) of the feeders 14 (Feed $A_1$ and Feed $A_2$), and a "B" block 44 (corresponding to the input matrix B) is subdivided to be fed into the PE array 12 through three feeder banks of banks 46 (e.g., $B_1$, $B_2$, and $B_3$ buffered by the buffer memories 23) of the feeders 16 (e.g., Feed $B_1$, $B_2$, and $B_3$). A "C" block 48 (corresponding to the result matrix C) includes six (e.g., 2×3=6) banks 49 (e.g., $C_{1,1}$, $C_{1,2}$, $C_{1,3}$, $C_{2,1}$, $C_{2,2}$, $C_{2,3}$ buffered by the buffer memories 25) of the PEs (e.g., $PE_{1,1}$, $PE_{1,2}$ ... $PE_{2,3}$), and each bank 49 is used to compute the matrix data from a combination of the bank 42 with the corresponding bank 46. For example, a "$C_{1,1}$" bank corresponds to computation of the matrix data from the combination of the $A_1$ and $B_1$ banks, a "$C_{1,2}$" bank corresponds to computation of the matrix data from the combination of the $A_1$ and $B_2$ banks, and so forth. Once data from the blocks 40 and 44 corresponding to the resulting banks 49 are processed, the banks 49 are drained and combined to form the "C" block 48.

Figure 4:
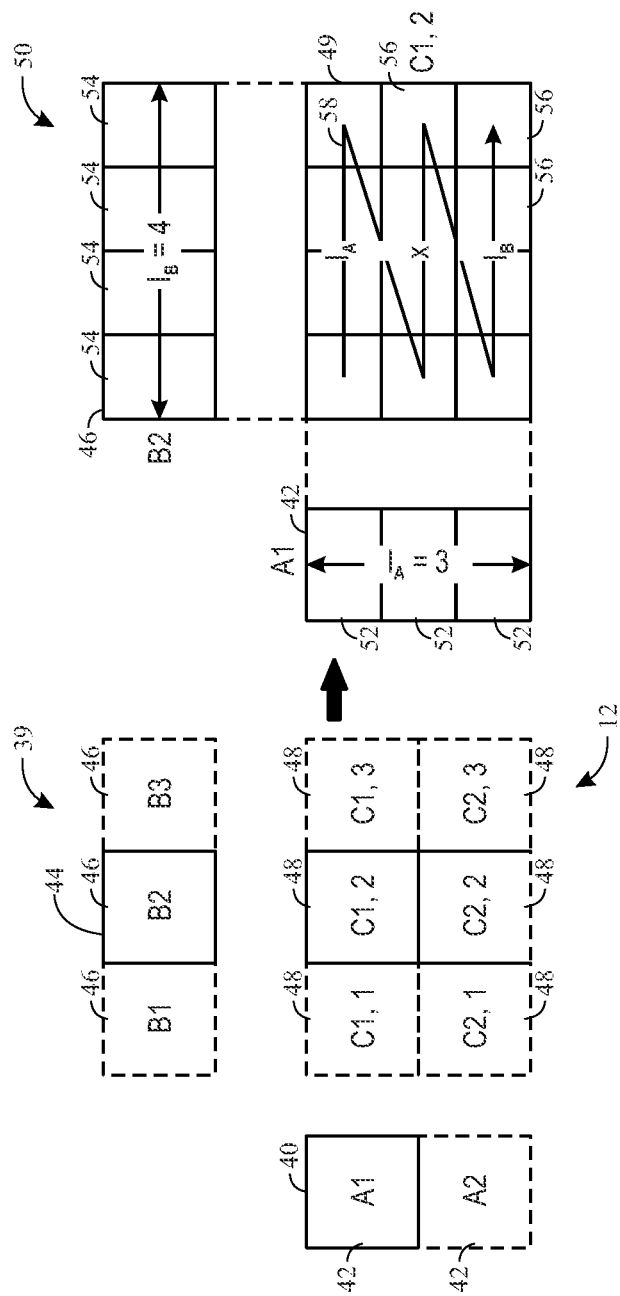
FIG. 4 is a block diagram showing an example interleaving (data reuse in space and in time) of bank data according to the SGEMM architecture of FIG. 1, in accordance with an embodiment.

Now consider that the banks 42 and 46 are further subdivided into "segments" or "interleave segments" such that feeders 14 and 16 can feed the matrix data in the banks 42 and 46 into the PE array 12, and reuse these bank data in space and in time (interleaved feed), which is the subject of "interleaving." As will be discussed, interleaving within feeder banks 42 and 46 is the data reuse mechanism that allows for reductions in the bandwidth requirement on the external memory 22. Such interleaving enables a temporal data reuse pattern similar to the spatial data reuse of the SGEMM 10. With the foregoing in mind, FIG. 4 shows an example of bank data reuse in space and time (interleaving or interleaved data feeding). In the illustrated embodiment, the block banking 39 (the diagram on the left) shows the spatial use of the bank $A_1$ and bank $B_2$ in computing the results in the bank $C_{1,2}$. Correspondingly, a diagram on the right shows a time interleave 50 of the bank data in bank $A_1$ and bank $B_2$. Each of the bank $A_1$ and bank $B_2$ is divided into a number of "segments," for example the bank $A_1$ is divided into three interleave segments 52 corresponding to an interleave factor of $I_A$=3, and the bank $B_2$ is divided into four interleave segments 54 corresponding to an interleave factor $I_B$=4.

To perform the matrix calculation in the $C_{1,2}$ bank, each one of the interleave segments 52 of the $A_1$ bank is sent $I_B$ (=4) times successively, and at the same time each one of the interleave segments 54 is repeated $I_A$ (=3) times. The result of such feeding pattern is the creation of the result segments 56 in the $C_{1,2}$ bank in the order depicted by a zig-zag arrow 58. The interleaved feeding pattern results in a time reuse of data in the same fashion that a 2D systolic array fundamentally reuses data in space, such that the bank data in the interleave segments 52 and 54 are reused $I_A \times I_B$ (=12 in this case) times. Specifically, the bank data in the interleave segments 52 and 54 are reused $I_A \times I_B$ (=12 in this case) times within the banks 42 and 46, instead of loading the matrix data every time (e.g., $I_A \times I_B$=12 times) from the external memory 22 (as in a nave implementation), and thus reduces the bandwidth demand on the external memory 22. For example, the interleaved data feeding leads to an $I_A \times I_B$ (=12) reduction of the bandwidth requirement of the external memory 22. At the finest level of granularity, feed "units or vectors" are feed into the PE array 12. In the PEs 12, the feed units either result in scalar or submatrix unit of accumulation. Each PE's bank (e.g., bank 49) includes of a number of units or vectors that is dictated by the total interleave factor (e.g., $I_A \times I_B$). The banks 49 of all of the PEs 12 are combined in a draining process to form the output matrix C block 48 (in FIG. 3) when drained to the external memory 22.

Figure 5:
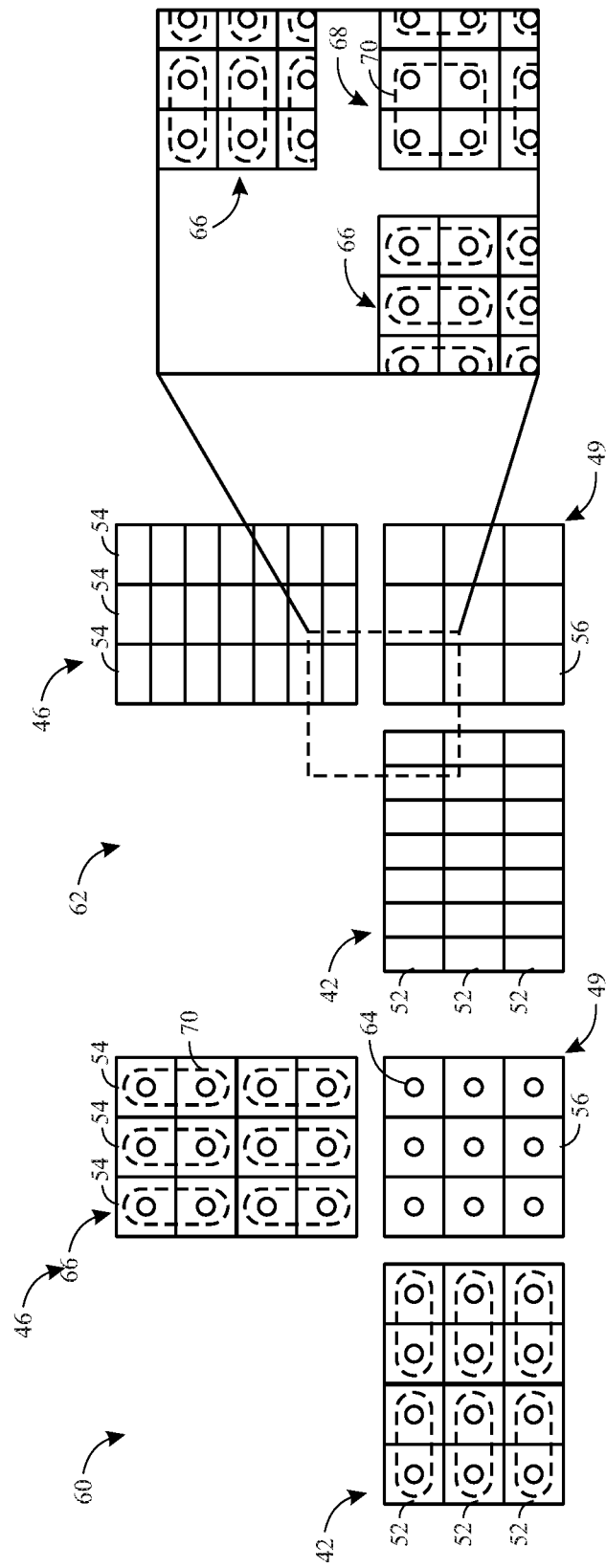
FIG. 5 is a block diagram illustrating a comparison between vectorization for inner product PE and outer product PE according to the SGEMM architecture of FIG. 1, in accordance with an embodiment.

It should be noted that the interleaved data feeding architecture set forth above is applicable to PE designs for calculation of both dense and sparse matrices. In the sparse case (e.g., a matrix in which some number of the matrix elements are zero, such as when most of the matrix elements are zero), multiplication performed by each PE is based on the inner product of two vectors, whereas in the dense case (e.g., a matrix in which most or a significant number of the matrix elements are not zero), multiplication performed by each PE is based on the outer product of two vectors. FIG. 5 shows a comparison between a PE architecture 60 for sparse matrix and a PE architecture 62 for dense matrix. In the illustrated example, each of the banks 42 and 46 is divided into three interleave segments 52 and 54 (e.g., $I_A = I_B = 3$), and each of the interleave segments 52 and 54 are further divided into vectors for the PE architectures 60 and 62. Specifically, scalar values are represented by open circles 64 that are grouped into interleave vector segments 66 by dashed enclosures 70.

For the PE architecture 60, the interleave segment 52 has a dimension of 1×4, including two interleave vector segments 66. The dot products of pairs of vectors from each pair of the interleave vector segments 66 is accumulated into scalar values in the PE bank 49. For example, the two banks 42 and 46 (of the feeders 14 and 16) are divided into the three interleave segments 52 and 54, respectively, resulting in an output bank 49 that has a dimension of 3×3. Each scalar value in the result segment 56 of the bank 49 is a result of the sum of two dot products of the interleave vector segments 66. In contrast, for the PE architecture 62, the interleave segment 52 has a dimension of 2×7, including seven interleave vector segments 66. The outer products of pairs of the interleave vector segments 66 generates a submatrix 68 in the result segment 56 of the bank 49. For example, the result of each outer product is accumulated into the 2×2 submatrix matrix 68 in the result segment 56 of the bank 49 (e.g., outer product of a 2×7 matrix and a 7×2 matrix is a 2×2 matrix. As such, the bank 49 includes the nine result segments 56, and each is a 2×2 sub-matrix that results from the element-wise accumulation of seven interleave vector segments 66. It should be noted that in both of the PE architectures 60 and 62, the interleave segments 52 and 54 are split into interleave vector segments 66, but the difference in vector orientation leads to much larger banks in the PE architecture 62 (given the interleave factors are identical for both cases, $I_A = I_B = 3$).

Although both sparse and dense PE architectures 60 and 62 for the SGEMM 10 are able to utilize either the inner or outer product (with suitable modification) to the systolic array architecture, the dichotomy between matrix and scalar results of outer and inner products makes inner product more suitable for multiplication of sparse matrices and outer product more suitable for multiplication of dense matrices. As will be discussed below with reference to FIG. 6 and FIG. 7, example PE microarchitectures are shown to cover all variants previously mentioned, including scalar, inner vector product, and outer vector product multiplications, as well as sparse and dense matrix multiplications.

Figure 6:
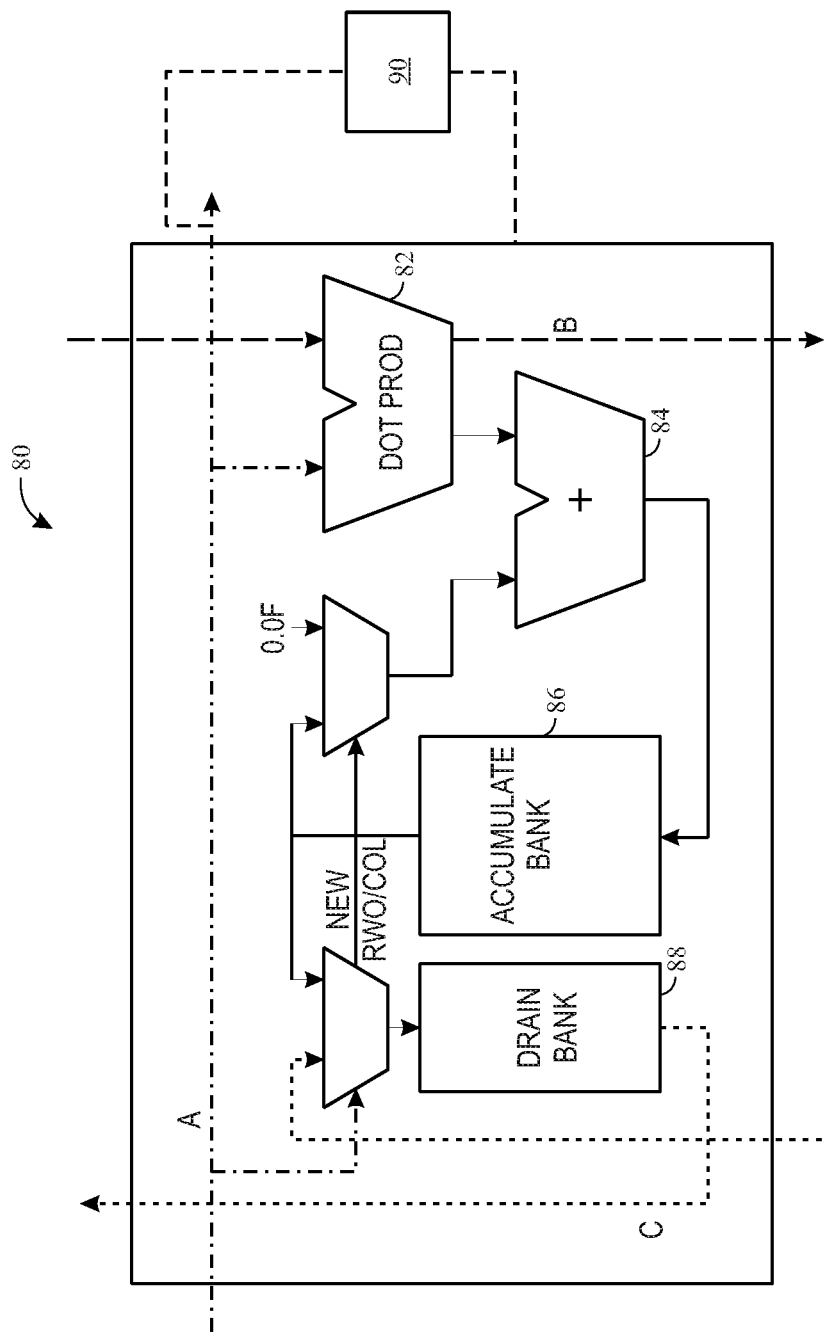
FIG. 6 is a block diagram of an example PE microarchitecture for interleaving of dense matrix according to the SGEMM architecture of FIG. 1, in accordance with an embodiment.

FIG. 6 shows an example of a PE microarchitecture 80 for a dense PE design suitable for any product (e.g., inner, outer, and scalar). In the illustrated embodiment, arrows A, B, and C depict data feeding/draining of matrices A, B, and C, respectively (e.g., matrix A fed by feeders 14 and matrix B fed by feeders 16). In the dense case, all fused multiply-adds (FMAs) are computed. As a result, it may be desirable for the PE microarchitecture 80 to be bound by FMAs. Inner product has the property that one scalar value is produced from two input vectors regardless of the vector's length. As such, computing scalar values in the result matrix (e.g., matrix C) may be considered a dot product of vectors chosen from the A and B matrices. Accordingly, matrix data or bank data from lines A and B are fed to a dot product engine 82, wherein this dot product engine 82 is configured to break the input matrices (e.g., matrices A and B) into sub-vectors of the length supported by the SGEMM 10. Using an accumulation engine 84, the PE array 12 then sum partial dot products from all of the subsectors in order to produce one scalar. For example, the inner product engine 82 ensures that the required accumulation memory is at a minimum, and each product may be done and sequentially accumulated at the accumulation engine 84. The result matrix (e.g., matrix C) is then accumulated at an accumulate bank 86 and drained from a drain bank 88. In one embodiment, automatically shifted shift registers may be used to implement the accumulate bank 86 and the drain bank 88. In one embodiment, pre-processing of the input matrices (matrices A and B) into suitable units for "blocking," "banking," and "interleaving" as discussed above may be performed by circuitry 90 (e.g., pre-processing circuitry) configured to prepare the input matrices to be fed into the PE array 12.

Figure 7:
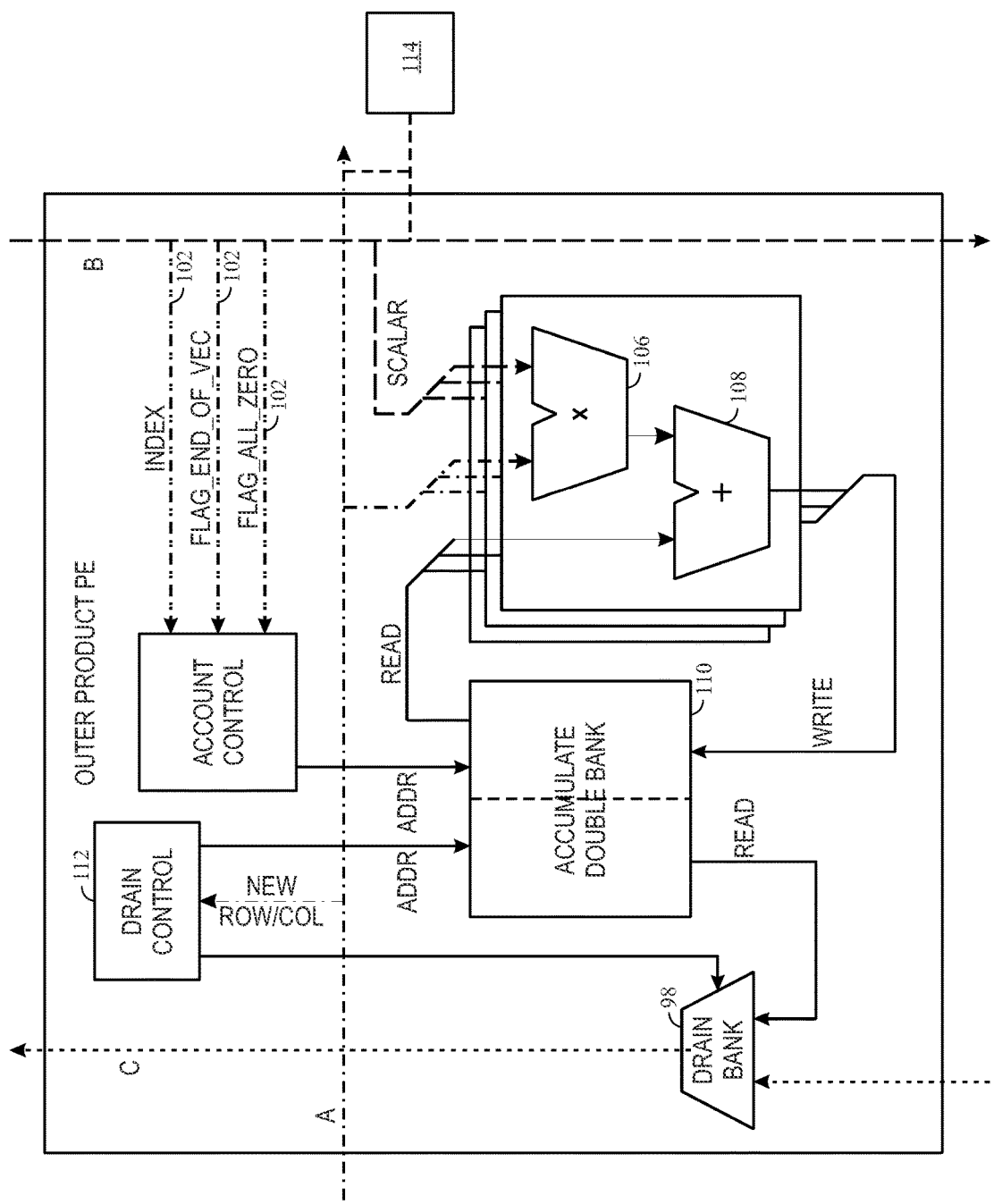
FIG. 7 is a block diagram of an example PE microarchitecture for interleaving of sparse matrix according to the SGEMM architecture of FIG. 1, in accordance with an embodiment.

Contrary to the dense case, where all FMAs are computed, in the sparse case, it may be desirable to skip as many FMA operations as possible. For example, in the case that an outer product computation results in (vector length) results, up to (vector length)$^2$ FMAs may be skipped in one cycle if the vectors are entirely sparse (e.g., all of the matrix elements are zero). Accordingly, the (vector size)$^2$ partial results may be stored in an accumulate bank to enable a (vector size)$^2$ skipping window (e.g., zero skipping). As may be appreciated, one of the considerations for designing a PE microarchitecture for calculating sparse matrices is how many zeros can be skipped and what portion of the computation can be avoided/recovered by performing zero skipping. With this in mind, FIG. 7 shows an example of a PE microarchitecture 100 for a sparse PE design suitable for outer product. In the illustrated embodiment, arrows A, B, and C depict data feeding/draining of matrices A, B, and C, respectively (e.g., matrix A fed by feeders 14 and matrix B fed by feeders 16). Vectors from matrix A and non-zero scalars from matrix B are fed with control flags 102 (e.g., an indication of all zeros, an indication of vector ends, and/or an index control flag). To facilitate zero skipping either feeders 14 or feeders 16 may be modified to create a schedule that signals the PE array 12 regarding which FMAs to be performed and which FMAs can be skipped. For example, the feeders 16 may create a schedule of non-zero values in each feed vector and send them one at a time, accompanied by the control signal or data, to the PE array 12.

The matrix data or bank data from lines A and B are fed to a cross product engine 106. The cross product engine 106 may break the input matrices (e.g., matrices A and B) into sub-vectors of the length supported by the SGEMM 10. Using an accumulation engine 108, the PE array 12 may sum partial cross products from all of the subsectors in order to produce one matrix. The result matrix (e.g., matrix C) may be accumulated at an accumulate bank 110 and drained from a drain bank 112. Specifically, utilizing the control signals (embedded in the control flags 102), an accumulator control block 104 selects which vector or partially accumulated results to be accumulated in the accumulate bank 110. The result matrix (e.g., matrix C) is then drained from a drain bank 98. In one embodiment, pre-processing of the input matrices (matrices A and B) into suitable units for "blocking," "banking," and "interleaving" as discussed above may be performed by circuitry 114 (e.g., pre-processing circuitry) configured to prepare the input matrices to be fed into the PE array 12. In one embodiment, the accumulate bank 110 includes double buffer banks in order to prevent results draining from blocking the multiplication computations.

Figure 8:
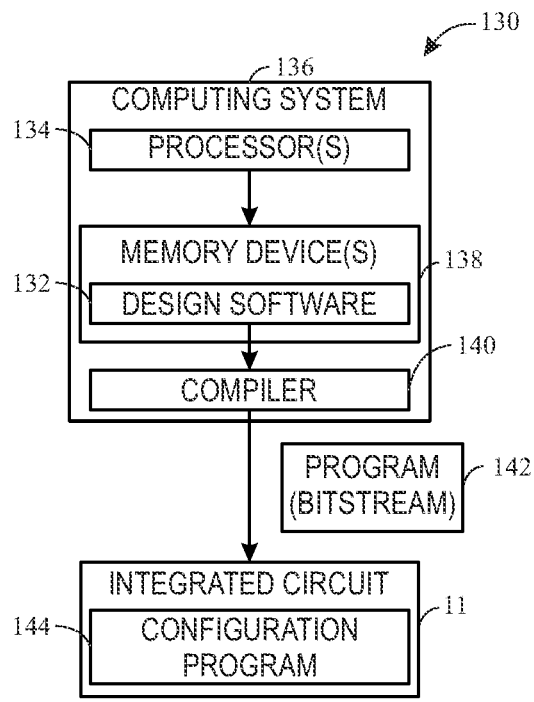
FIG. 8 is an integrated circuit system that may be used to carry out an implementation of a systolic array, in accordance with an embodiment.
Figure 9:
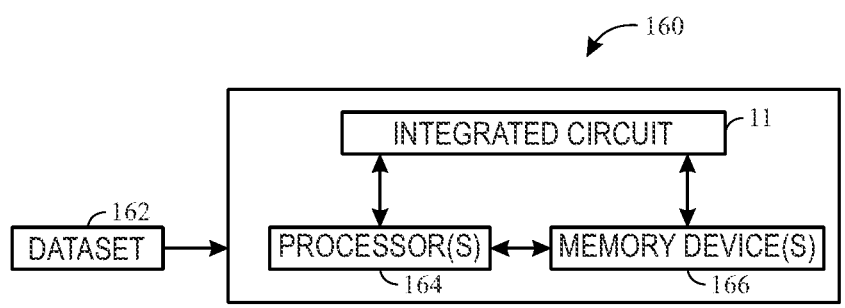
FIG. 9 is an example of an electronic system for processing datasets using the systems and methods of this disclosure, in accordance with an embodiment.

With the foregoing in mind, FIG. 8 illustrates a block diagram of a system 130 that may be used to program an SGEMM onto the integrated circuit 11. The integrated circuit 11 may be reconfigurable (e.g., a field programmable gate array (FPGA)) or may be an application-specific integrated circuit (ASIC). A user may implement a circuit design to be programmed onto the integrated circuit 11 using design software 132, such as a version of Quartus by Altera™.

The design software 132 may be executed by one or more processors 134 of a computing system 136. The computing system 136 may include any suitable device capable of executing the design software 132, such as a desktop computer, a laptop, a mobile electronic device, a server, or the like. The computing system 136 may access, configure, and/or communicate with the integrated circuit 11. The processor(s) 134 may include multiple microprocessors, one or more other integrated circuits (e.g., application specific integrated circuits, field programmable gate arrays, reduced instruction set processors, and the like), or some combination of these.

One or more memory devices 138 may store the design software 132. In addition, the memory device(s) 138 may store information related to the integrated circuit 11, such as control software, configuration software, look up tables, configuration data, etc. In some embodiments, the processor(s) 134 and/or the memory device(s) 138 may be external to the computing system 136. The memory device(s) 138 may include a tangible, non-transitory, machine-readable-medium, such as a volatile memory (e.g., a random access memory (RAM)) and/or a nonvolatile memory (e.g., a read-only memory (ROM)). The memory device(s) 138 may store a variety of information and be used for various purposes. For example, the memory device(s) 138 may store machine-readable and/or processor-executable instructions (e.g., firmware or software) for the processor(s) 134 to execute, such as instructions to determine a speed of the integrated circuit 11 or a region of the integrated circuit 11, determine a criticality of a path of a design programmed in the integrated circuit 11 or a region of the integrated circuit 11, programming the design in the integrated circuit 11 or a region of the integrated circuit 11, and the like. The memory device(s) 138 may include one or more storage devices (e.g., nonvolatile storage devices) that may include read-only memory (ROM), flash memory, a hard drive, or any other suitable optical, magnetic, or solid-state storage medium, or any combination thereof.

The design software 132 may use a compiler 140 to generate a low-level circuit-design program 142 (bitstream), sometimes known as a program object file, which programs the integrated circuit 11. That is, the compiler 140 may provide machine-readable instructions representative of the circuit design to the integrated circuit 11. For example, the integrated circuit 11 may receive one or more programs 142 (bitstreams) that describe the hardware implementations that should be stored in the integrated circuit 11. The programs 142 (bitstreams) may programmed into the integrated circuit 11 as a configuration program 144.

The integrated circuit 11 may operate in a data processing system 160 to assist in processing a dataset 162 using the SGEMM systems and methods of this disclosure. The data processing system 160 may represent, for example, a computing device in a datacenter, which may process network traffic, image data, video data, financial data, or any other suitable form of data. In some examples, the dataset 162 may be processed using a machine-learning or neural-network algorithm that may employ the SGEMM of this disclosure. Processor(s) 164 may execute instructions (e.g., software or firmware) stored in memory and/or storage 166 to receive and route the dataset 162 and to control the integrated circuit 11. For instance, the processor(s) 164 may run software to analyze process network traffic, image data, video data, financial data, or any other suitable form of data, offloading to the integrated circuit 11 operations that are well-suited to processing by a SGEMM on the integrated circuit 11. The memory and/or storage 166 may store the one or more programs 142 (bitstreams) that may be used to program a programmable fabric of the integrated circuit 11 (e.g., when the integrated circuit 11 is a programmable logic device, such as a field-programmable gate array (FPGA)).

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A systolic array architecture implemented in circuitry of an integrated circuit, comprising:
   a processing element array, comprising:
   processing elements to perform multiplication of matrices; and
   a processing element buffer memory for each of the processing elements;
   a column feeder array communicatively coupled to a first orthogonal edge of the processing element array, comprising:
   column feeders each communicatively coupled to a corresponding processing element to feed a first matrix into the processing element array; and
   a column feeder buffer memory for each of the column feeders; and
   a row feeder array communicatively coupled to a second orthogonal edge of the processing element array, adjacent to the first orthogonal edge, comprising:
   row feeders each communicatively coupled to a corresponding processing element to feed a second matrix into the processing element array; and a row feeder buffer memory for each of the row feeders, wherein the column feeder array and row feeder array are communicatively coupled to an external memory to access one or more interleaved segments of first blocks of the first matrix and one or more interleaved segments of second blocks of the second matrix, and a bandwidth consumption of the external memory is reduced by a factor of reduction in relation to a non-interleaving feeding pattern at least in part by interleaving of the one or more interleaved segments of each block of the first matrix and each block of the second matrix via a feeding pattern of the column feeder array and the row feeder array, wherein the first blocks each represents a row of the first matrix and the second blocks each represents a column of the second matrix.

2. The systolic array architecture of claim 1, wherein the column feeder array and the row feeder array send the one or more interleaved segments of the first blocks of the first matrix and the one or more interleaved segments of the second blocks of the second matrix, respectively, according to a hierarchy, wherein the hierarchy comprises:
the first blocks each represents a row of the first matrix, wherein each of the first block is divided into a first number of first interleave segments that are banked in the corresponding column feeder buffer memory; and
the second blocks each represents a column of the second matrix, wherein each of the second block is divided into a second number of second interleave segments banked in the corresponding row feeder buffer memory.

3. The systolic array architecture of claim 2, wherein the column feeder array receives the one or more interleaved segments of the first blocks of the first matrix from the external memory one of the first blocks at a time, and the row feeder array receives the one or more interleaved segments of the second blocks of the second matrix from the external memory one of the second blocks at a time.

4. The systolic array architecture of claim 2, wherein the feeding pattern comprises that each of the column feeders sends the first interleave segments a number of times corresponding to the second number of interleave segments to the processing element array, and each of the row feeders sends the second interleave segments a number of times corresponding to the first number of interleave segments to the processing element array.

5. The systolic array architecture of claim 2, wherein the factor of reduction equals to the first number times the second number.

6. The systolic array architecture of claim 1, wherein the processing element array performs inner product multiplication in response to the first matrix being a sparse matrix, the second matrix being a sparse matrix, or both.

7. The systolic array architecture of claim 1, wherein the processing element array performs outer product multiplication in response to the first matrix being a dense matrix, the second matrix being a dense matrix, or both.

8. The systolic array architecture of claim 1, wherein the external memory comprises a memory of a field-programmable gate array (FPGA).

9. The systolic array architecture of claim 1, wherein the processing element buffer memory stores a partial result of the multiplication of matrices.

10. The systolic array architecture of claim 1, wherein the column feeder array and the row feeder array are configured to process a dataset provided by a local processor in communication with the integrated circuit on which the column feeder array and the row feeder array are disposed.

11. A matrix multiplication circuit, comprising:
first feeders to feed a first type matrix data of a first matrix, received by the first feeders from an external memory;
second feeders to send a second type matrix data of a second matrix, received by the second feeders from the external memory; and
a processing element array comprising processing elements communicatively coupled to the first and second feeders to receive the first type matrix data and the second type matrix data, comprising:
multiple cross-product multipliers to perform matrix multiplication using the first and second types of matrix data;
multiple accumulators to accumulate partial outer product results, generated by the multiple cross-product multipliers, into a final result matrix; and
a drain bank to drain the final result matrix;
wherein the first type matrix data comprises vectors that are communicated by the first feeders one vector at a time, and the second type matrix data comprises scalars that are communicated by the second feeders one value at a time.

12. The matrix multiplication circuit of claim 11, wherein the first and second feeders send the first and second type matrix data with control flags and the multiple accumulators select which of the partial outer product results to be accumulated into the final result matrix.

13. The matrix multiplication circuit of claim 11, comprising double buffer banks to prevent the partial outer product results draining from blocking computation of matrix multiplication.

14. The matrix multiplication circuit of claim 11, wherein at least one of the first matrix and the second matrix comprises a sparse matrix.

15. The matrix multiplication circuit of claim 11, wherein the processing element array is communicatively coupled to the first feeders along a first orthogonal edge of the processing element array and is coupled to the second feeders along a second orthogonal edge of the processing element array, adjacent to the first orthogonal edge.

16. The matrix multiplication circuit of claim 11, wherein the matrix multiplication circuit is programmed into a programmable fabric of a field programmable gate array (FPGA).

17. The matrix multiplication circuit of claim 11, wherein the matrix multiplication circuit is disposed on an application-specific integrated circuit (ASIC).

18. A matrix multiplication circuit, comprising:
first feeders to feed a first type matrix data of a first matrix, received by the first feeders from an external memory;
second feeders to send a second type matrix data of a second matrix, received by the second feeders from the external memory; and
a processing element array comprising processing elements communicatively coupled to the first and second feeders to receive the first type matrix data and the second type matrix data, comprising:
a dot-product multiplier to perform matrix multiplication using the first and second types of matrix data;
an accumulator to accumulate partial inner product results, generated by the dot-product multiplier, into a final result matrix; and
a drain bank to drain the final result matrix;
wherein the first type matrix data comprises vectors that are communicated by the first feeders one vector at a time and the second type matrix data comprises vectors that are communicated by the second feeders one vector at a time.

19. The matrix multiplication circuit of claim 18, wherein at least one of the first matrix and the second matrix comprises a dense matrix.

20. The matrix multiplication circuit of claim 18, wherein the processing element array is communicatively coupled to the first feeders along a first orthogonal edge of the processing element array and is coupled to the second feeders along a second orthogonal edge of the processing element array, adjacent to the first orthogonal edge.

21. The matrix multiplication circuit of claim 18, wherein the matrix multiplication circuit is disposed in a data processing system, wherein the data processing system comprises:
   a processor configured to receive a dataset; and
   a memory device configured to store the dataset;
   wherein the processing element array of the matrix multiplication circuit is configured to multiply matrices of the dataset.

\* \* \* \* \*